US007835753B2

(12) United States Patent
Alfert et al.

(10) Patent No.: US 7,835,753 B2
(45) Date of Patent: Nov. 16, 2010

(54) ELECTRONIC TOLL SYSTEM FOR TRAFFIC ROUTES, AND METHOD FOR THE OPERATION THEREOF

(75) Inventors: Burkhard Alfert, Steinfurt (DE); Rolf-Edgar Barth, Bärenbach (DE); Walter Kerndlmaier, Königswinter (DE)

(73) Assignee: T-Mobile International AG & Co KG, Bonn (DE)

( * ) Notice: Subject to any disclaimer, the term of this patent is extended or adjusted under 35 U.S.C. 154(b) by 796 days.

(21) Appl. No.: 10/593,221

(22) PCT Filed: Mar. 18, 2005

(86) PCT No.: PCT/DE2005/000512

§ 371 (c)(1),
(2), (4) Date: Jul. 11, 2007

(87) PCT Pub. No.: WO2005/091229

PCT Pub. Date: Sep. 29, 2005

(65) Prior Publication Data

US 2007/0275731 A1 Nov. 29, 2007

(30) Foreign Application Priority Data

Mar. 18, 2004 (DE) ....................... 10 2004 013 807

(51) Int. Cl.
*H04W 24/00* (2009.01)

(52) U.S. Cl. ................................ 455/456.1; 455/414.1

(58) Field of Classification Search ......... 455/410–465; 705/1–13; 701/201–210
See application file for complete search history.

(56) References Cited

U.S. PATENT DOCUMENTS 4,676,187 A 6/1987 Grabowski (Continued)

FOREIGN PATENT DOCUMENTS

DE 10032409 2/2001

(Continued)

OTHER PUBLICATIONS 3 pages of Summary of the Notice of Reasons for Refusal in English.

*Primary Examiner*—Kent Chang
*Assistant Examiner*—Kashif Siddiqui
(74) *Attorney, Agent, or Firm*—Norris McLaughlin & Marcus, PA; Christa Hildebrand, Esq.

(57) ABSTRACT

The invention relates to an electronic toll system for traffic routes, said system being designed on the basis of commercial GSMIUMTS mobile telephones or comparable appliances such as a PDA, car phones etc., with a GSM function, and to a method for the operation thereof. In each mobile radio network, data of the respective radio cell is transmitted to the radio telephone via an organization channel. According to the invention, said information supplied by the base transceiver stations is used to record the radio cells crossed by the toll customer. The collected data is transmitted to a central toll station. The toll traffic route taken by the vehicle can be deduced with high precision, by comparison with databases relating to existing traffic routes, on the basis of the series of crossed radio cells transmitted by the terminal of the toll customer. According to the invention, no changes need to be carried out on the hardware of current mobile radio systems and terminals. The existing mobile radio terminals radio telephones etc., are generally available for toll customers and can be used thereby.

23 Claims, 4 Drawing Sheets

U.S. PATENT DOCUMENTS

| | | | | |
|---|---|---|---|---|
| 5,184,303 | A * | 2/1993 | Link | 701/210 |
| 5,509,052 | A * | 4/1996 | Chia et al. | 455/465 |
| 5,550,738 | A * | 8/1996 | Bailey et al. | 455/456.5 |
| 5,694,322 | A | 12/1997 | Westerlage et al. | |
| 5,970,481 | A | 10/1999 | Westerlage et al. | |
| 5,974,356 | A * | 10/1999 | Doyle et al. | 701/209 |
| 6,199,010 | B1 * | 3/2001 | Richton | 701/206 |
| 6,594,576 | B2 * | 7/2003 | Fan et al. | 701/117 |
| 6,705,521 | B1 | 3/2004 | Wu et al. | |
| 6,741,927 | B2 * | 5/2004 | Jones | 701/201 |
| 2001/0037174 | A1 | 11/2001 | Dickerson | |
| 2003/0115095 | A1 * | 6/2003 | Yamauchi | 705/13 |
| 2003/0195697 | A1 * | 10/2003 | Jones | 701/201 |
| 2005/0107951 | A1 * | 5/2005 | Brulle-Drews et al. | 701/209 |
| 2007/0142050 | A1 * | 6/2007 | Handforth et al. | 455/436 |
| 2008/0030376 | A1 * | 2/2008 | Tunnell et al. | 340/988 |

FOREIGN PATENT DOCUMENTS

| | | | |
|---|---|---|---|
| DE | 101 04 499 | | 8/2002 |
| DE | 10200495 | | 7/2003 |
| EP | 1 278 163 | A | 1/2003 |
| JP | 49 42589 | B | 11/1974 |
| JP | 62 236548 | A | 10/1987 |
| JP | 11238152 | A | 8/1999 |
| JP | 2001243513 | A | 9/2001 |
| WO | WO 9834199 | | 8/1998 |
| WO | WO 0111571 | | 2/2001 |
| WO | WO 03063088 | | 7/2003 |

* cited by examiner

Booking plausible

Not completely booked

Terminal temporarily inoperative

Temporarily leaving the route

ELECTRONIC TOLL SYSTEM FOR TRAFFIC ROUTES, AND METHOD FOR THE OPERATION THEREOF

BACKGROUND OF THE INVENTION

The invention is directed into an electronic toll system for traffic routes and to a method for its operation.

An intensive discussion has emerged in Europe about an optimally designed toll system, the type of systems that can be used internationally and are interoperable, and that can be used economically and flexibly. These questions and the desired system characteristics, respectively, could not been harmonized to date, because each country and each infrastructure operator has his own ideas about the technologies to be used or planned with the system for collecting tolls.

It would nevertheless be desirable and advantageous for users of the traffic routes in Europe to harmonize the employed toll systems at least within the EU. Other countries seeking to become members of the EU also wrestle with the question, which systems and technologies they should implement in the future for collecting tolls.

In general, the EU seeks to implement with the support of the owners and drivers of vehicles an acquisition and billing system based on a device installed in the vehicle, i.e., a system located in the vehicle, and a common bill for all traveled roads subject to tolls within the EU based on a contractual relationship, for example in the country of residence. A person subject to tolls has to pay the fees based on the regulatory and private conditions, if he intends to utilize or has already utilized traffic infrastructures subject to tolls. In other words, the person subject to tolls is obligated to pay the tolls and can select system used for paying the toll.

One of the great success stories in the development of the technologies, standardization and introduction into the market of these new technologies and products in Europe as well as worldwide was of the mobile communication standard GSM. The development was influenced significantly by the cooperation between France and Germany and the telecommunications industry, which together led to worldwide success. GSM is therefore an excellent candidate as a communication carrier for a vehicle-based toll systems.

DE 101 04 499 A1 teaches a toll acquisition system with a vehicle unit for vehicle-autonomous determination of a toll for a vehicle within a toll billing region. Data required for determining the toll are transmitted to the vehicle device as necessary from an operator center via a communication device. The vehicle device continuously determines incurred partial tolls for traveled road sections and the total toll for a trip by summation of the individual partial tolls. When reaching the destination or when meeting other predetermined criteria, the vehicle terminal transmits the toll determined until that time via the communication device to the operator center for billing.

In conventional toll systems, the accuracy, in particular a precise determination of a vehicle location by satellite navigation plays an important role. A large portion of the technologies which were in part especially designed for toll collection is used for providing this high accuracy. The tolls are computed in the vehicle terminal, which offers attack points for manipulation.

BRIEF SUMMARY OR THE INVENTION

It is the object of the invention to provide an electronic toll system for traffic routes, which is based on existing and widely available technologies and which can therefore be implemented very quickly, cost-effectively and also across borders, as well as a method for its operation.

Advantageous embodiments and additional advantageous features of the invention are recited in the dependent claims.

The invention is based on the concept to implement an electronic toll system based on conventional GSM/UMTS mobile telephones or comparable devices such as PDA, car phone, etc., with GSM functionality. According to the basic idea, the already internationally interoperable mobile radio systems, e.g., GSM, are employed exclusively for the communication between the toll customer and the toll operator. According to the invention, no changes to the hardware are necessary on the existing mobile radio systems and terminals. The existing mobile terminals, radio telephones, etc., are typically installed at the toll customer and can therefore be utilized. Existing system interfaces for data transmission, for billing, etc., can also be used without necessitating considerable changes.

In every mobile radio network, data of a respective radio cell are transmitted to the radio telephone via an organization channel, i.e., the radiotelephone is continuously informed of the radio cell in which it is currently located. This information supplied by the fixed radio stations is customarily used to record in the radio telephone the radio cells traversed by the toll customer. The collected data are then transmitted to the toll center according to several options, e.g., according to time, online customers order, etc.

Based on the sequential order of the traversed radio cells transmitted by the terminal of the person required to pay the toll, it can be determined with high accuracy by comparison with databases about existing traffic routes which (toll) route the vehicle has traveled. The longer the traveled route, the greater the accuracy with which the route can be determined.

Short routes, for example on highways, can be verified either not at all or only relatively inaccurately, unless the mobile radio operator optimizes his network configuration along particularly relevant highway sections. However, a plausibility check is not always possible.

As soon as terminals with built-in satellite navigation receivers, for example GPS, Galileo, become available, short routes can also be determined with high accuracy using satellite navigation. Even today, the accuracy for determining a location within a radio cell can be increased, if required, by measuring the propagation time of the radio signals transmitted to the toll terminal.

A clear separation between the traffic infrastructure operators (possibly a monopoly), the competitive international toll operators, and the network operators/service providers cooperating nationally and internationally is an additional advantage of the invention.

In the toll system according to the invention, the accuracy of the location determination or of the toll road used by the person required to pay the toll plays only a secondary role, because it is based on the premise that the person required to pay the toll announces the toll to be traveled on his own and that the system only needs to verify this information.

It is usually difficult to bill with the toll system of the invention the exact amount for short trips. Accordingly, either no toll at all is collected for short trips because the expense for their collection is too high, or a flat rate is collected.

Conversely, it can be plausibly demonstrated on long trips that the toll customer has traveled over toll roads. The proposed toll system represents a competitive alternative on long trips to the existing toll collecting entities.

The institutions participating in the toll collection can also assume multiple roles, for example, the toll operator can also be a GSM service provider and vice versa.

The toll is preferably billed to the toll customer via the mobile phone bill of the toll customer. However, the toll operator can also collect the toll directly by invoicing or by deducting the amount from the account of the toll customer.

During the toll trip, the toll operator can preferably perform plausibility checks of the traveled route, for example, by evaluating the traversed cells or by randomly determining the location of the mobile terminal.

Advantageously, intermediate checkpoints can be established which, unlike in other toll collect systems, can be flexibly defined. The number and location of the checkpoints can be defined for each toll trip individually, without informing the driver of the vehicles subject to tolls. This makes deception and sabotage more difficult than with existing systems.

An improved plausibility check of the toll trip is possible, for example, by defining so-called "forbidden intermediate checkpoints" (blacklist checkpoints), i.e., checkpoints (radio cells) which the toll customer is not allowed to cross with his vehicle. The toll center can ask the toll terminal to immediately indicate a possible crossing of certain neuralgic points that are not part of the booked toll route.

It is also possible to adapt the architecture, wherein direct interfaces between the infrastructure operators and mobile radio operators can be used without involvement of the toll operator, e.g., for precise vehicle location determination. The architecture can be adapted so that under competitive circumstances, clearinghouses mediate between several mobile radio operators and respective toll operators and/or between toll operators and infrastructure operators.

A combination of usable mobile radio mechanisms, such as SMS, GPRS, and Voice can be used for communication between the toll customer and the toll center. For example, an easier start-destination input can be provided by a voice menu or an IVR portal (Interactive Voice Recognition) with the response "Configuration and Confirmation SMS".

Various system enhancements through additional functionality can be envisioned. For example, trip interruptions or route changes can be communicated to the toll center via the toll terminal.

The booking information to be transmitted from the toll customer to the toll center can be preconfigured via an Internet portal, so as to later support and facilitate input via mobile telephone. For example, roads frequently traveled by the toll customer can be permanently stored and recalled via a reference number. It is then only necessary to transmit the reference number to the toll center for booking a certain route.

On the other hand, the mobile-radio-based communication connection between toll center and toll terminal can also be used to transmit to the terminal of the toll customer traffic information, traffic route information (e.g., special pricing for special routes), weather information, etc.

If necessary, a standard mobile telephone or a special mobile telephone, i.e., a mobile telephone with special customized operation for toll customers, or an inexpensive mobile telephone with reduced functionality, can be employed as a toll terminal.

Advantageously, the EU-wide and the additional functionality of the communication component advantageously allows use of existing GSM roaming mechanisms without additional infrastructure expenses, so that no country-specific toll devices (On-Board Units) are required in foreign countries.

Communication between the mobile radio operator and the toll operator for determining the toll and billing can be conducted entirely via the interfaces that already exist in the mobile radio environment.

The toll customer can use existing standard mobile radio contracts for toll collection. Many types of mobile radio contracts are suitable, such as postpaid/prepaid contracts, individual contracts, for example, for self-employed persons and for passenger car tolls, master agreements for trucking companies, etc.

In his role as a GSM service provider, the toll operator can also issue his own toll cards (SIM cards) without having to build up a dedicated GSM infrastructure.

The clean separation of the roles between GSM operator, toll operator and infrastructure operator offers the customer considerable competition, both in the relationship as a GSM customer and as a toll customer.

The system can advantageously be employed in addition to existing toll systems, but is also suitable as a basic component in countries without an existing toll collection infrastructure, because it can be constructed quickly and inexpensively.

An exemplary embodiment of the invention will now be described with reference to the drawings. The specification discloses additional features, advantages and possible applications of the invention

DETAILED DESCRIPTION OF THE INVENTION

Figure 1:
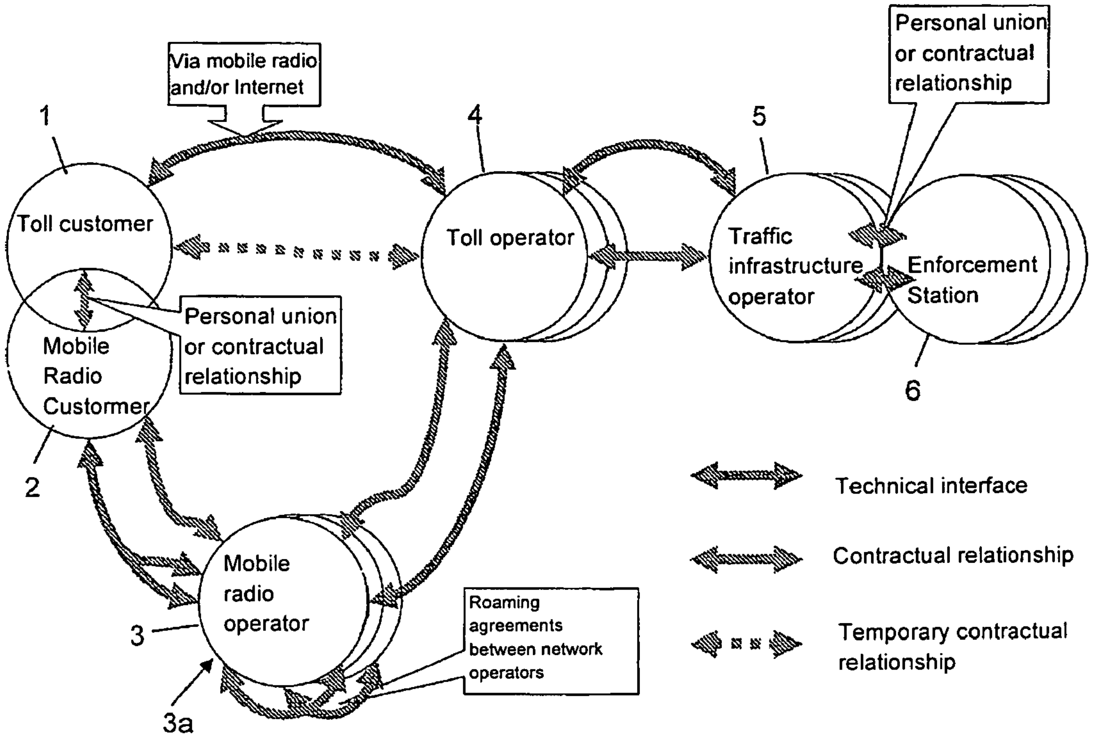
FIG. 1 shows a schematic diagram of the parties participating in the toll system according to the invention.

The described toll system is a mobile radio-based toll system which can operate across borders. GSM, UMTS or similar cellular mobile radio systems can be used, which in the following will be referred to synonymously as GSM. The toll system is suitable for all types of traffic routes, such as roads/highways, waterways, railways, and for all types of vehicles using those routes. The toll system can be implemented as a stand-alone system or can be overlaid with existing toll systems.

For implementing the toll system, the following components are provided:

Toll Device:

Preferably, a (GSM) mobile radio terminal of a mobile radio customer is employed as a toll terminal, which is used for determining the toll inside the vehicles subject to tolls. The mobile telephone as a vehicle terminal (On-Board Unit) includes a toll-client application, which is alternatively implemented:

on standard SIM (SAT application)

on special SIM as application software in the mobile telephone (e.g., Java applet)

as device-specific firmware (for special toll terminals)

as additional hardware/software module

The toll terminal has the following tasks:

sending a message about start/stop of the trip subject to tolls (manually or automatically)

detecting the traversed radio cells and sending a list of the determined radio cells to the toll center. As location information of the radio cells, the Cell Global ID (CGI) is used in GSM and the Service Area ID (SAI) in UMTS. The message can be sent in regular intervals, upon request, and/or at the end of the trip.

sending a message when crossing checkpoint radio cells which were defined by the toll center when the trip was announced and/or during the trip optionally providing the actual location when asked by the toll center Toll Center:

The toll center is a technical facility of the toll operator which provides the technical interfaces to the parties participating in the toll system, in particular mobile radio network operators, traffic infrastructure operators, controlling units (enforcement stations), etc.

The toll center provides the functions:

as communication partner of the toll customers for recording the toll trips for invoicing/billing the toll customer and collecting the tolls, for example, via the mobile radio operator for settling the tolls with the road infrastructure operators for providing information about registered toll trips/checkpoints crossings to the road infrastructure operators with respect to the controlling force (enforcement).

Mobile Radio Networks:

The existing mobile radio networks are used for communication across borders between the toll terminal and the toll operator determining the location of the toll terminal billing of the toll trip, for example, via the mobile radio invoice Intermediate Checkpoints:

An intermediate checkpoint is a checkpoint of the infrastructure operator. In conventional toll collection systems, these are for example highway bridges equipped with cameras for automatically recording the license plates of all passing vehicles. Within the context of the invention, each mobile radio cell can operate as a checkpoint and can be defined individually for each toll customer and for each trip. Typically, at a short distance after the checkpoint, an exit road is provided for the enforcement authorities (exit or parking area), where the toll evaders and vehicles that were not positively identified can be pulled over and checked.

FIG. 1 shows the cooperation of the aforedescribed components as a modular architecture with the participating parties, tasks and interfaces:

Mobile Radio Customer 1:

The mobile radio customer 1 is a contract customer of a GSM network operator or a service provider to be used for collecting the tolls via the mobile radio invoice.

Mobile Customer 2:

The mobile customer 2 is the owner/operator of the vehicle subject to tolls, normally identical to or closely related to the mobile radio customer 1. The toll customer is a temporary contract partner of the toll operator for the toll trip.

The toll customer books the toll trip in advance and notifies the toll center of the start and stop of the toll trip.

Mobile Radio Network Operator 3:

The mobile radio network operator 3 is the home network operator of the mobile radio customer with whom the customer has a contractual relationship. The mobile radio network operator 3 provides technical interfaces to the toll operator and enables data communication (e.g., via SMS, GPRS or Voice) and billing (e.g. the existing PayPerEvent Interfaces). The mobile network operator handles roaming in other mobile radio networks during trips to foreign countries.

Roaming Network Operator 3*a*:

The roaming network operator 3*a* is a network operator providing the network for communicating with the toll terminal when the vehicle is located in a foreign country. The standard GSM roaming contracts apply to technical connections and inter-operator billing between the home network operator 3 and the roaming network operators 3*a*. The roaming network operator handles the mobile radio communication with the toll terminal in a foreign country and forwards the data traffic to the home network operator. The roaming network operator also settles surcharges with the home network operator through existing roaming processes.

Toll Operator 4:

The toll operator 4 operates one or several toll centers and handles the toll transactions with respect to the toll customer 1 via the mobile radio home network operator 3, and with respect to the traffic infrastructure operator 5. The toll operator 4 has for the duration of the toll trip a contractual relationship with the toll customer 1, for example through verification via coupon SMS. The toll operator also has contractual relationships and operates technical interfaces with those mobile radio network operators 3 who he wants to use for conducting toll transactions. The toll operator also has contractual relationships with all relevant infrastructure operators 5 and reimburses them for all handled toll trips and provides technical interfaces for "enforcement" support, for example through notification of checkpoints crossings, inquiries with respect to specific vehicles and toll coupons.

The toll operator can set checkpoints for individual toll trips, e.g., also upon request/definition by the infrastructure operators.

Traffic Infrastructure Operator 5

The traffic infrastructure operator 5 provides the road infrastructure and conducts official or private "enforcement" functions, i.e., conducts vehicle checks himself or delegates them to legally separate enforcement entities.

Enforcement Station 6:

The enforcement station 6 conducts traffic checks on-site to identify and prosecute toll evaders; in the case of a government infrastructure, this is for example the highway patrol.

Figure 2:
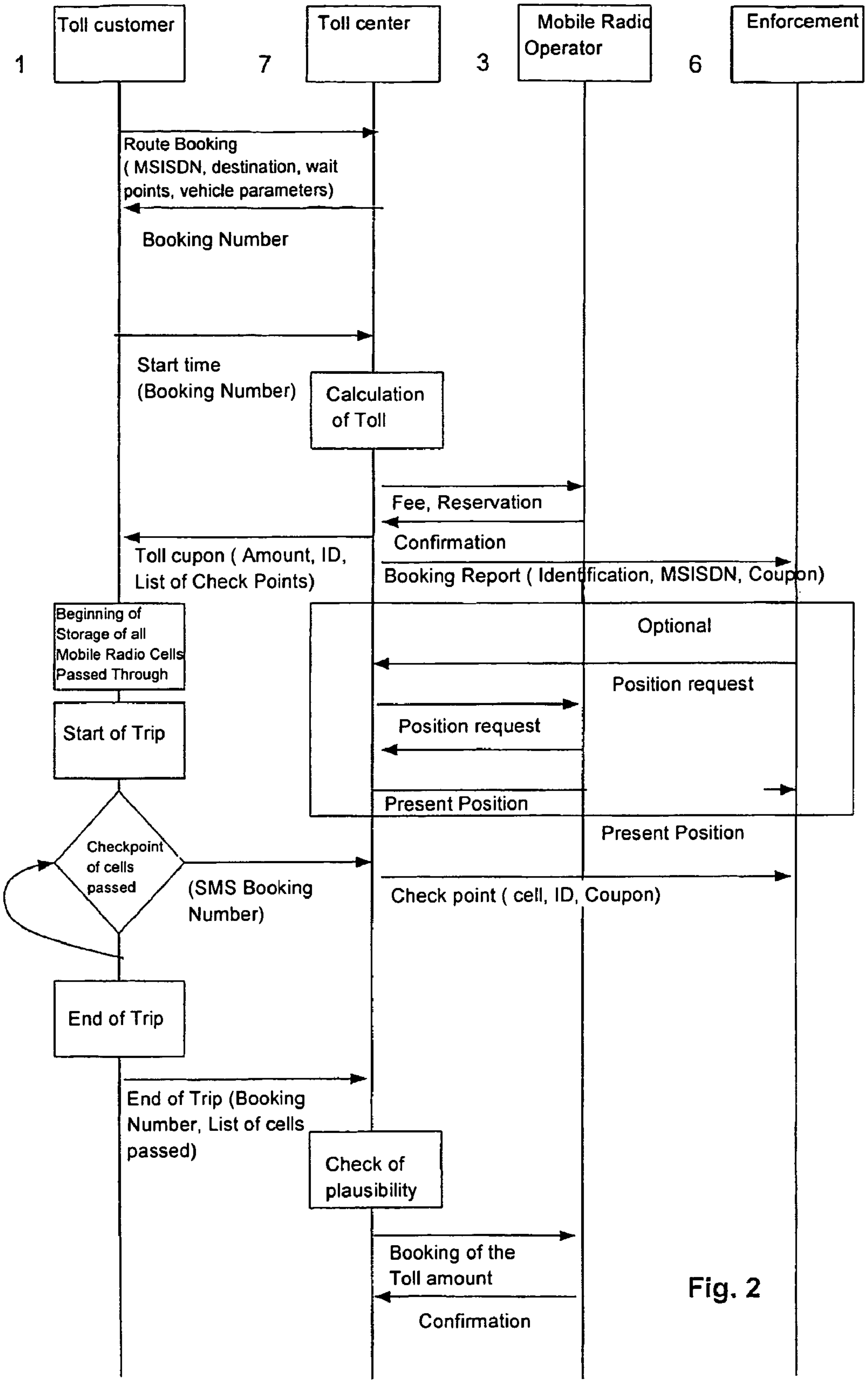
FIG. 2 shows a flow diagram for toll collection.

The basic process of toll collection will now be described with reference to FIG. 2:

At the start of each trip with toll road sections, the toll customer 1 notifies the toll center 7 of the toll operator 4 of the planned route. This "booking" can be conducted via different communication accesses. For example, an SMS can be sent, communication can be conducted via data channels of the mobile radio network, a voice access can be used with IVR systems, or access can be provided via the Internet. At the time of registration/booking, the toll customer transmits preferably the following contents:

his identity, for example, in the form of a mobile radio subscriber number (MSISDN) or another unique reference for the toll operator concerning the identity and the MSISDN of the toll customer the vehicle data relevant for determining the toll, e.g., vehicle type, number of axles, weight, hazard class, etc., or another reference to these data which are unique for the toll operator the license plate, registration number or another unique customary or commercial identification of the vehicle start point of the trip optionally intermediate points for identifying alternative routes destination of the trip planned start time If the time when the trip is booked long before the planned start time, then the toll center 7 sends to a suitable terminal of the customer a booking reference.

Immediately before the start of the trip, the toll customer transmits the booking reference to the toll center 7.

If the trip is booked immediately before the trip begins, then transmission of a booking reference to the toll customer 1 can be omitted. In this case, the process goes immediately to the next step.

When receiving the booking reference or when the trip is booked immediately before the start of the trip, the toll center 7 computes the tolls to be collected and transmits to the toll customer via SMS or via a data channel of the mobile radio network the following data:

the amount of the toll charges a sequence of symbols, in the following referred to as "toll coupon", which includes the essential booking information (at least the start point, destination, license plate) and which according to current standards is perceived as being secure and thus protected against manipulation (digital signature of the toll operator).

a list of mobile radio cells (identified, e.g., by the CGI) which are defined as "checkpoints".

If the toll is billed on the mobile radio invoice of the mobile radio customer, then the mobile radio operator requests from the toll center a confirmation with a guarantee that the billed amount is covered, as is customary with today's PayPerEvent interfaces as a first step of a "two-phase payment" transaction.

The terminal obtains and stores during the trip the radio cell identification (CGI) of all traversed mobile radio cells.

If the terminal detects a mobile radio cell listed in the list of checkpoints, then it sends immediately the content of the toll coupon to the toll center 7, which forwards all received toll coupons to the enforcement stations responsible for the respective checkpoint. This enables the enforcement stations to reliably identify all vehicles which have paid the toll, based on the transmitted data (in particular the license plate numbers).

If the toll customer would like to change the routing, he can do that by transmitting the following data to the toll center:

Toll coupon

Checkpoints that have changed compared to the existing routing. Alternatively, detours can already be indicated or proposed by the toll center at the time of booking. In this case, only a reference needs to be transmitted.

The enforcement station can determine by locating the toll customer during the trip via the mobile radio operator, if the customer has switched his terminal on and if the terminal is located in a plausible mobile radio cell. The determination of the location can be refined by conventional propagation time methods or by satellite positioning.

When the toll customer reaches his destination, he sends another message to the toll center with the following contents:

Toll coupon

A list of all detected mobile radio cells

The plausibility of the routing can be checked in the toll center 7 based on the traversed cells. The reliability of the plausibility check increases with the number of the traversed cells. If the plausibility check leads to a negative result, then the corresponding enforcement stations 6 can be informed.

If the plausibility checked is successful, the toll can be invoiced via the mobile radio operator 3, typically as the second step of a "2-phase payment" transaction. Alternatively, the toll operator can invoice the toll customer directly.

FIGS. 3 to 6 illustrate different situations that can result from a final evaluation of the list of traversed cells transmitted from the toll terminal to the toll center. It will be assumed that the toll customer has booked the route AB. The individual radio cells are indicated by circles and ovals, respectively. The radio cells detected by the toll terminal, i.e., actually traversed by the toll customer, are emphasized in gray.

Figure 3:
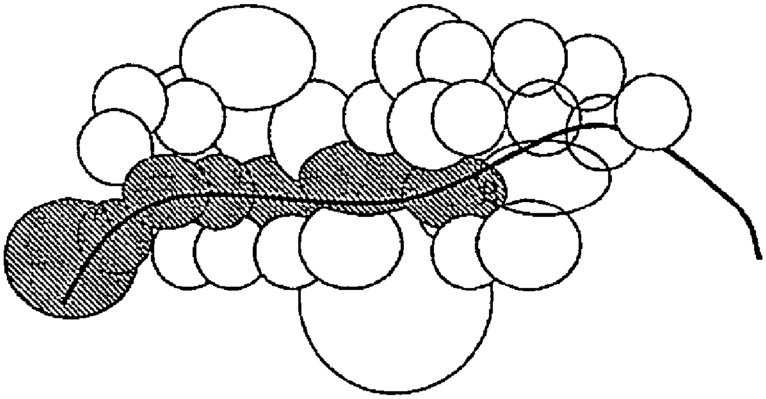
FIGS. 3-6 show different examples with results of the final valuation of the list of traversed radio cells sent from the toll terminal to the toll center.

FIG. 3 shows an example of a successful plausibility check. The list of the cells returned by the toll terminal matches the announced route AB within the achievable granularity (accuracy).

Figure 4:
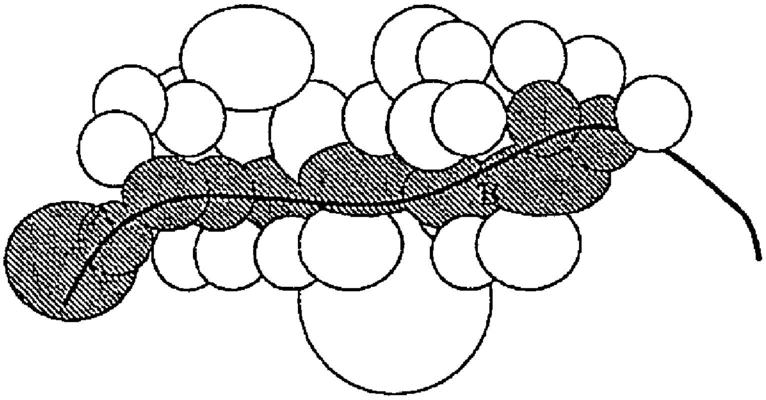

FIG. 4 shows a situation where the plausibility check indicates a route which is longer than the route initially announced at the time of booking. The list of the returned radio cells uniquely demonstrates within the achievable granularity that an additional route was traveled in addition to the route initially indicated. In this case, the toll customer pays for the actually traveled route.

Figure 5:
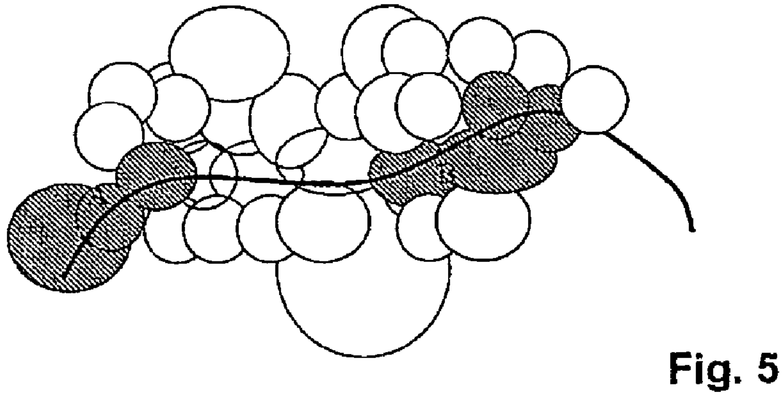

According to FIG. 5, the plausibility check shows that the toll device did not record tolls at certain times during the trip, e.g., by intentionally switching the device off (a longer intermediate route is missing), by short-term loss of network coverage (individual cells are missing), or due to a defective toll device. The toll operator can react differently depending on the actual situation. If the checkpoints were located along the route section that was not detected, then the local enforcement stations may be automatically requested to check the toll customer, because the toll terminal did not, as agreed, indicate the passage (missing positive check, which would have provided free passage).

Figure 6:
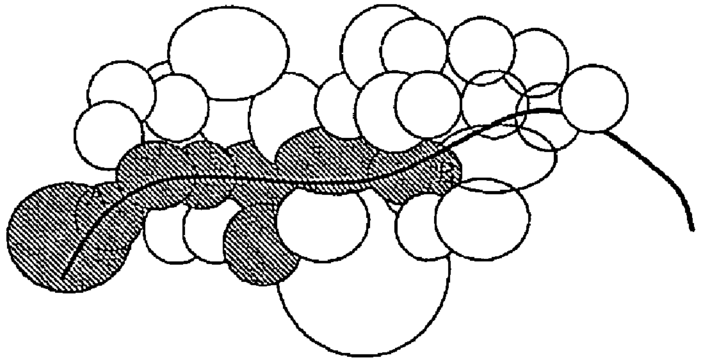

A plausibility check depicted in FIG. 6 indicates that additional routes were traveled in the meantime, in addition to the booked route AB, because an "irregular" radio cell was detected in the depicted example. The toll operator can conclude from the number of the returned irregular radio cells, if the toll route was left only for short time, for example for purchasing fuel or stopping at a rest area, or if an additional toll road was used unannounced.

The invention claimed is:

1. A method for operating an electronic toll system for traffic routes, by using at least one cellular mobile communication system comprising a plurality of mobile radio cells, a toll terminal of a toll customer in form of a terminal compatible with the mobile communication system, and at least one toll center for conducting the toll transactions between the toll customer and a toll operator, wherein the method comprises the steps of:

registering the toll customer with the toll terminal at the toll center before the start of a trip on road sections subject to toll by transmitting an identification of the toll customer and booking of a toll route transmitting information about a planned route, wherein the information includes at least one start point and one destination, wherein during registration the following additional contents are transmitted from the toll terminal of the toll customer to the toll center: vehicle data for calculating the tolls, a unique identification of the vehicle, optionally intermediate points for identifying alternative routes, planned start time, capturing and storing in the toll terminal a list of a sufficient number of mobile cells traversed during the trip for later verification of the booked toll route, transmitting a message from the toll terminal to the toll center at the end of the trip, wherein the message includes the list of the captured and stored mobile cells, verifying the booked toll route by the toll center based on a comparison between the list of the traversed mobile cells and data about the routing of the toll roads, billing of the toll to be collected from the toll customer based on the booked toll route and the predetermined tariff data.

2. The method for operating an electronic toll system according to claim 1, wherein after the toll customer has registered with the toll center, a billing and/or toll information is transmitted from the toll center to the toll terminal.

3. The method for operating an electronic toll system according to claim 1, wherein the toll center computes the tolls to be collected when the booking information is received or when booked immediately before the start of the trip, and transmits the computed tolls to the toll terminal of the toll customer together with a toll coupon.

4. The method for operating an electronic toll system according to claim 1, wherein the toll coupon includes the essential information of the booking in form of start point, trip destination, license plate number.

5. The method for operating an electronic toll system according to claim 1, wherein the toll center defines along the booked toll route one or more intermediate checkpoints which correspond to one or several mobile cells located along the route, and wherein a list of the intermediate checkpoints is transmitted to the toll terminal.

6. The method for operating an electronic toll system according to claim 1, wherein the toll center defines prohibited intermediate checkpoints which the toll customer is not allowed to pass through.

7. The method for operating an electronic toll system according to claim 1, wherein the toll terminal, when detecting a mobile cell corresponding to an intermediate checkpoint or to a prohibited intermediate checkpoint, immediately transmits to the toll center the content of the toll coupon or of another unique reference relating to the booked toll route.

8. The method for operating an electronic toll system according to claim 1, wherein the toll center forwards received toll coupons or the subset of the data of the toll coupons relevant for a enforcement station to the enforcement stations responsible for the respective intermediate checkpoint.

9. The method for operating an electronic toll system according to claim 1, wherein a change in the booked toll route by the toll customer is implemented by transmitting the toll coupon and those checkpoints which have changed from the previous toll route.

10. The method for operating an electronic toll system according to claim 1, wherein the message transmitted to the toll center upon arrival at the destination also includes the toll coupon.

11. The method for operating an electronic toll system according to claim 1, wherein the transmission of information between the toll terminal and the toll center takes place via the mobile communication system and/or other wireless or wired information systems.

12. The method for operating an electronic toll system according to claim 1, wherein the toll fee is billed on a mobile radio invoice of the mobile radio customer associated with the toll customer.

13. The method for operating an electronic toll system according to claim 1, wherein it can be determined by locating the toll terminal through the mobile radio operator if the toll customer has switched his toll terminal on or if the toll terminal is located in a plausible mobile radio cell.

14. The method for operating an electronic toll system according to claim 1, wherein the toll terminal is located by measuring the propagation time of the mobile radio signals.

15. The method for operating an electronic toll system according to claim 1, wherein the toll terminal is located by satellite positioning.

16. An electronic toll system for traffic routes, which uses at least one cellular mobile communication system comprising a plurality of mobile radio cells, and which comprises at least one toll terminal of a toll customer in form of a terminal compatible with the mobile communication system and a toll center for conducting toll transactions between a toll customer and a toll operator, wherein the system includes the following components:

- a data storage device in the toll center for storing identification data of the toll customer and a booked toll route based on information about a planned route, wherein the information includes at least a start point and a trip destination, and additionally vehicle data for calculating the tolls, a unique identification of the vehicle, optionally intermediate points for identifying alternative routes, planned start time,
- a memory in the toll terminal for storing a list of mobile radio cells, which are traversed during the trip and captured by the toll terminal, and which are sufficient for later verification,
- a data processing unit in the toll center for verification of the booked toll route of the toll customer based on a comparison between the list of mobile radio cells and data relating to the routing of roads subject to tolls,
- a billing unit for billing the toll to be collected from the toll customer based on the booked route and predetermined tariff data.

17. Electronic toll system according to claim 16, wherein a special SIM card provided with a toll-client application is used in the terminal employed by the toll customer.

18. Electronic toll system according to claim 16, wherein a SIM card with a standard SIM card is employed used in the terminal employed by the toll customer, wherein the toll-client application is implemented in form of a SAT application.

19. Electronic toll system according to claim 16, wherein the terminal employed by the toll customer includes special application software designed for the toll system, in particular a Java applet.

20. Electronic toll system according to claim 16, wherein the booking information to be transmitted from the toll customer to the toll center is preconfigured via an Internet portal so as to support and facilitate subsequent input via a toll terminal.

21. Electronic toll system according to one of the preceding claim 16, wherein toll routes frequently traveled by the toll customer are permanently stored at the toll center and can be recalled by using a reference number.

22. Electronic toll system according to claim 16, wherein to check if the booked toll route is adhered to, intermediate checkpoints are defined, whose number and location are independently defined for each toll route without providing this information to the toll customer.

23. Electronic toll system according to claim 16, wherein for verifying if the booked toll route is adhered to, facilities are provided that provide to the road infrastructure operators information regarding captured toll trips and/or checkpoint crossings for the controlling agencies (enforcement).

* * * * *